(12) United States Patent  (10) Patent No.: US 9,245,217 B2
Shirasaki et al.  (45) Date of Patent: Jan. 26, 2016

(54) OPTICAL WRITING DEVICE, IMAGE FORMING APPARATUS, AND METHOD FOR CONTROLLING OPTICAL WRITING DEVICE

(75) Inventors: Yoshinori Shirasaki, Osaka (JP); Masayuki Hayashi, Osaka (JP); Yasuo Yamaguchi, Osaka (JP); Kunihiro Komai, Osaka (JP); Tatsuya Miyadera, Osaka (JP); Motohiro Kawanabe, Osaka (JP); Hiroaki Ikeda, Osaka (JP); Akinori Yamaguchi, Osaka (JP); Fuminori Tsuchiya, Osaka (JP); Motoyoshi Takahashi, Osaka (JP)

(73) Assignee: RICOH COMPANY, LIMITED, Tokyo (JP)

( * ) Notice: Subject to any disclaimer, the term of this patent is extended or adjusted under 35 U.S.C. 154(b) by 402 days.

(21) Appl. No.: 13/572,937

(22) Filed: Aug. 13, 2012

(65) Prior Publication Data

US 2013/0044176 A1  Feb. 21, 2013

(30) Foreign Application Priority Data

Aug. 19, 2011  (JP) .................................. 2011-179630

(51) Int. Cl.
  *G06K 15/02* (2006.01)
  *B41J 2/45* (2006.01)
  *B41J 2/47* (2006.01)
  *G03G 15/01* (2006.01)
  *G03G 15/04* (2006.01)

(52) U.S. Cl.
  CPC .............. *G06K 15/1894* (2013.01); *B41J 2/45* (2013.01); *B41J 2/47* (2013.01); *G03G 15/0189* (2013.01); *G03G 15/04054* (2013.01)

(58) Field of Classification Search
  CPC .............. B41J 2/385; B41J 2/435; B41J 2/47; B41J 2/45
  USPC .......... 347/116, 118, 130, 232, 234, 238, 248
  See application file for complete search history.

(56) References Cited

U.S. PATENT DOCUMENTS

2009/0190178 A1*  7/2009  Saito ............................ 358/1.16
2011/0193931 A1*  8/2011  Kawada et al. ............... 347/238

FOREIGN PATENT DOCUMENTS

| JP | 06-227037   | 8/1994  |
| JP | 2003-285473 | 10/2003 |
| JP | 2007-106126 | 4/2007  |
| JP | 2009-186754 | 8/2009  |

\* cited by examiner

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

An optical writing device forms an electrostatic latent image and includes a pixel-information acquiring unit that acquires pixel information and stores the acquired pixel information in a storage medium with respect to each main scanning line; a tilt correcting unit that generates a tilt correction signal specifying a main scanning line from which the pixel information to be input to a light source is read out from the storage medium in order to correct a tilt of the electrostatic latent image; a position correcting unit that generates a position correction signal specifying a timing to input the pixel information to the light source in order to correct a position of the electrostatic latent image; and a pixel-information-input control unit that controls input of the pixel information from the storage medium to the light source in response to the tilt correction signal and the position correction signal.

8 Claims, 7 Drawing Sheets

OPTICAL WRITING DEVICE, IMAGE FORMING APPARATUS, AND METHOD FOR CONTROLLING OPTICAL WRITING DEVICE

CROSS-REFERENCE TO RELATED APPLICATIONS

The present application claims priority to and incorporates by reference the entire contents of Japanese Patent Application No. 2011-179630 filed in Japan on Aug. 19, 2011.

BACKGROUND OF THE INVENTION

1. Field of the Invention

The present invention relates to an optical writing device, an image forming apparatus, and a method of controlling the optical writing device.

2. Description of the Related Art

Recently, digitization of information tends to be promoted, and image forming apparatuses, like printers and facsimile machines used for output of digitized information and scanners used for digitization of documents, have become essential apparatuses. Many image forming apparatuses include imaging functions, image forming functions, communication functions, and the like, to be configured as multifunction peripherals that are usable as printers, facsimile machines, scanners, and copiers.

Of these image forming apparatuses, electrophotographic image forming apparatuses are widely used as image forming apparatuses used for output of digitized documents. An electrophotographic image forming apparatus forms an electrostatic latent image on a photosensitive element by exposing a photosensitive element, and develops the electrostatic latent image into a toner image using a developer such as toner, and transfers the toner image onto a sheet of paper to output the sheet of paper.

There are several types of optical writing device which exposes a photoreceptor to an optical beam in an electrophotographic image forming apparatus: a laser diode (LD) raster optical system type and a light emitting diode (LED) writing type. The LD raster optical system type of optical writing device includes a light source, which emits a beam to expose a photoreceptor, and a deflector, such as a polygon scanner, for deflecting the emitted beam to scan the entire surface of the photoreceptor; the LED writing type of optical writing device includes an LED array (LEDA) head. In such an optical writing device, the LD raster optical system type has an error due to skew, positional shift, etc. of an f-theta lens and a reflecting mirror; the LED writing type has skew, an installation error, etc. of the LEDA head.

The LED writing type of optical writing device forms an electrostatic latent image by exposing a photosensitive drum with the use of an LEDA as described above. The on/off of light emission of each of LED elements included in the LEDA is controlled depending on an image to be formed and output. Therefore, when pixel information indicating the on/off of light emission of each of the LED elements is generated on the basis of information of the image to be formed and output, a control unit for controlling the LEDA stores the generated pixel information in a line memory with respect to each main scanning line, and then controls the on/off of light emission of the LEDA in accordance with the predetermined control timing.

Furthermore, there have been known methods to correct misregistration of an image in a sub-scanning direction or skew due to an assembly error of an LEDA or a photosensitive drum by controlling the read of pixel information stored in a line memory (for example, see Japanese Patent Application Laid-open No. 2007-106126).

Conventionally, such corrections of misregistration and skew as described above are made by installing different line memories; therefore, it is necessary to install a line memory with respect to each function, and this causes an increase in cost of an optical writing device including an LEDA.

There is a need to reduce the number of line memories installed in an optical writing device and the cost of the device.

SUMMARY OF THE INVENTION

It is an object of the present invention to at least partially solve the problems in the conventional technology.

An optical writing device forms an electrostatic latent image on a photoreceptor. The optical writing device includes: a pixel-information acquiring unit that acquires pixel information, which is information on pixels composing an image to be formed as the electrostatic latent image, and stores the acquired pixel information in a storage medium with respect to each main scanning line; a tilt correcting unit that generates a tilt correction signal specifying a main scanning line from which the pixel information to be input to a light source, which exposes the photoreceptor to light, is read out from the storage medium in order to correct a tilt of the electrostatic latent image formed on the photoreceptor; a position correcting unit that generates a position correction signal specifying a timing to input the pixel information to the light source in order to correct a position of the electrostatic latent image formed on the photoreceptor in a sub-scanning direction; and a pixel-information-input control unit that controls input of the pixel information from the storage medium to the light source in response to the tilt correction signal and the position correction signal.

An image forming apparatus includes an optical writing device that forms an electrostatic latent image on a photoreceptor. The optical writing device includes: a pixel-information acquiring unit that acquires pixel information, which is information on pixels composing an image to be formed as the electrostatic latent image, and stores the acquired pixel information in a storage medium with respect to each main scanning line; a tilt correcting unit that generates a tilt correction signal specifying a main scanning line from which the pixel information to be input to a light source, which exposes the photoreceptor to light, is read out from the storage medium in order to correct a tilt of the electrostatic latent image formed on the photoreceptor; a position correcting unit that generates a position correction signal specifying a timing to input the pixel information to the light source in order to correct a position of the electrostatic latent image formed on the photoreceptor in a sub-scanning direction; and a pixel-information-input control unit that controls input of the pixel information from the storage medium to the light source in response to the tilt correction signal and the position correction signal.

A method of controlling an optical writing device that forms an electrostatic latent image on a photoreceptor, includes: acquiring pixel information, which is information on pixels composing an image to be formed as the electrostatic latent image, and storing the acquired pixel information in a storage medium with respect to each main scanning line; generating a tilt correction signal specifying a main scanning line from which the pixel information to be input to a light source, which exposes the photoreceptor to light, is read out from the storage medium in order to correct a tilt of the electrostatic latent image formed on the photoreceptor and outputting the generated tilt correction signal; generating a position correction signal specifying a timing to input the pixel information to the light source in order to correct a position of an electrostatic latent image formed on the photoreceptor in a sub-scanning direction and outputting the generated position correction signal; and controlling input of the pixel information from the storage medium to the light source in response to the tilt correction signal and the position correction signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention is explained in detail below with reference to accompanying drawings. In the present embodiment, a multifunction peripheral (MFP) is described as an example of an image forming apparatus. Incidentally, the image forming apparatus does not have to be an MFP; for example, the image forming apparatus can be a copier, a printer, a facsimile machine, or the like.

Figure 1:
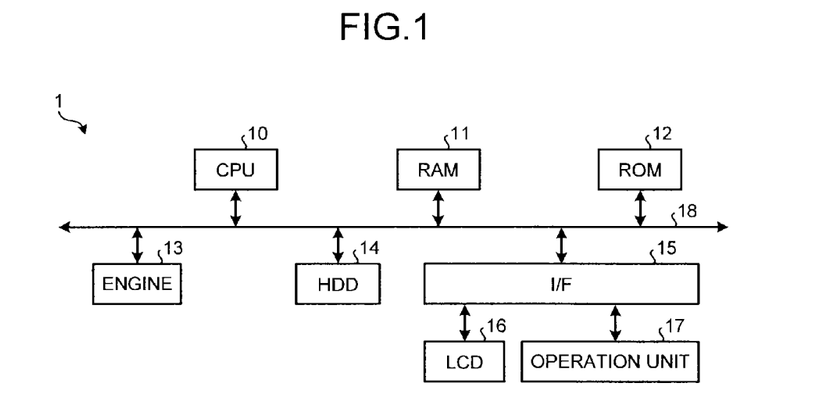
FIG. 1 is a block diagram showing a hardware configuration of an image forming apparatus according to an embodiment of the present invention.

FIG. 1 is a block diagram showing a hardware configuration of an image forming apparatus 1 according to an embodiment of the present invention. As shown in FIG. 1, the image forming apparatus 1 according to the present embodiment has an engine that performs image formation in addition to the same configuration as a general server or information processing terminal such as personal computer (PC). Namely, in the image forming apparatus 1 according to the present embodiment, a central processing unit (CPU) 10, a random access memory (RAM) 11, a read-only memory (ROM) 12, an engine 13, a hard disk drive (HDD) 14, and an interface (I/F) 15 are connected to one another via a bus 18. Furthermore, a liquid crystal display (LCD) 16 and an operation unit 17 are connected to the I/F 15.

The CPU 10 is a computing unit, and controls operation of the entire image forming apparatus 1. The RAM 11 is a volatile storage medium capable of high-speed read/write of information, and is used as a work area of the CPU 10 when the CPU 10 processes information. The ROM 12 is a read-only nonvolatile storage medium, and stores therein a program such as firmware. The engine 13 is a mechanism which actually performs image formation in the image forming apparatus 1.

The HDD 14 is a nonvolatile storage medium capable of read/write of information, and stores therein an operating system (OS), various control programs and application programs, and the like. The I/F 15 connects the bus 18 to various hardware and a network, etc., and controls the connection. The LCD 16 is a visual user interface provided to allow a user to check a status of the image forming apparatus 1. The operation unit 17 is a user interface, such as a keyboard and a mouse, provided to allow a user to input information to the image forming apparatus 1.

In such a hardware configuration, a program stored in the ROM 12, the HDD 14, or a recording medium such as an optical disk (not shown) is loaded into the RAM 11, and the CPU 10 performs an operation in accordance with the program, thereby making up a software control unit. A function block which implements functions of the image forming apparatus 1 according to the present embodiment is composed of a combination of the software control unit made up in this way and the hardware.

Figure 2:
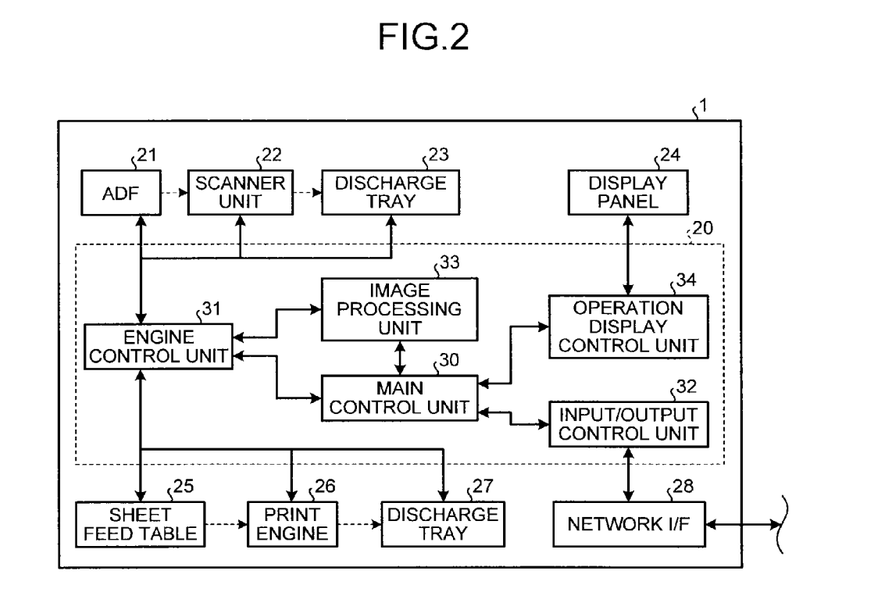
FIG. 2 is a diagram showing a functional configuration of the image forming apparatus according to the embodiment of the present invention.

Subsequently, a functional configuration of the image forming apparatus 1 according to the present embodiment is explained with reference to FIG. 2. FIG. 2 is a block diagram showing the functional configuration of the image forming apparatus 1 according to the present embodiment. As shown in FIG. 2, the image forming apparatus 1 according to the present embodiment has a controller 20, an auto document feeder (ADF) 21, a scanner unit 22, a discharge sheet tray 23, a display panel 24, a sheet feed table 25, a print engine 26, a discharge tray 27, and a network I/F 28.

The controller 20 includes a main control unit 30, an engine control unit 31, an input/output control unit 32, an image processing unit 33, and an operation display control unit 34. As shown in FIG. 2, the image forming apparatus 1 according to the present embodiment is configured as an MFP having the scanner unit 22 and the print engine 26. Incidentally, in FIG. 2, electrical connections are indicated by solid arrows, and the flow of a sheet is indicated by dashed arrows.

The display panel 24 is an output interface to visually display thereon a status of the image forming apparatus 1 and also is an input interface (an operation unit) used as a touch panel when a user directly operates the image forming apparatus 1 or inputs information to the image forming apparatus 1. The network I/F 28 is an interface provided to allow the image forming apparatus 1 to communicate with other devices via a network; an Ethernet (registered trademark) interface or a universal serial bus (USB) interface is used as the network I/F 28.

The controller 20 is composed of a combination of software and hardware. Specifically, control programs, such as firmware, stored in the ROM 12 or a nonvolatile memory and the HDD 14 or a nonvolatile recording medium such as an optical disk are loaded into a volatile memory (hereinafter, referred to as a "memory") such as the RAM 11, and a software control unit made up in accordance with the control of the CPU 10 and hardware, such as an integrated circuit, compose the controller 20. The controller 20 serves as a control unit to control the entire image forming apparatus 1.

The main control unit 30 serves to control the units included in the controller 20, and gives an instruction to each unit in the controller 20. The engine control unit 31 serves as a drive unit to control or drive the print engine 26, the scanner unit 22, and the like. The input/output control unit 32 inputs a signal or instruction input via the network I/F 28 to the main control unit 30. Furthermore, the main control unit 30 controls the input/output control unit 32 and accesses another device via the network I/F 28.

The image processing unit 33 generates drawing information on the basis of print information included in an input print job in accordance with the control of the main control unit 30. The drawing information is information to draw an image that the print engine 26, which is an image forming unit, should form in the image forming operation, or is information on pixels composing an image to be output, i.e., pixel information. Furthermore, the print information included in the print job is image information converted in a form that the image forming apparatus 1 can recognize by a printer driver installed on an information processing apparatus such as a PC. The operation display control unit 34 displays information on the display panel 24 or notifies the main control unit 30 of information input through the display panel 24.

When the image forming apparatus 1 operates as a printer, first, the input/output control unit 32 receives a print job via the network I/F 28. The input/output control unit 32 transfers the received print job to the main control unit 30. When receiving the print job, the main control unit 30 controls the image processing unit 33 and causes the image processing unit 33 to generate drawing information on the basis of print information included in the print job.

When the drawing information has been generated by the image processing unit 33, the engine control unit 31 performs image formation on a sheet fed from the sheet feed table 25 on the basis of the generated drawing information. Namely, the print engine 26 serves as an image forming unit. The sheet on which an image has been formed by the print engine 26 is discharged onto the discharge tray 27.

Figure 3:
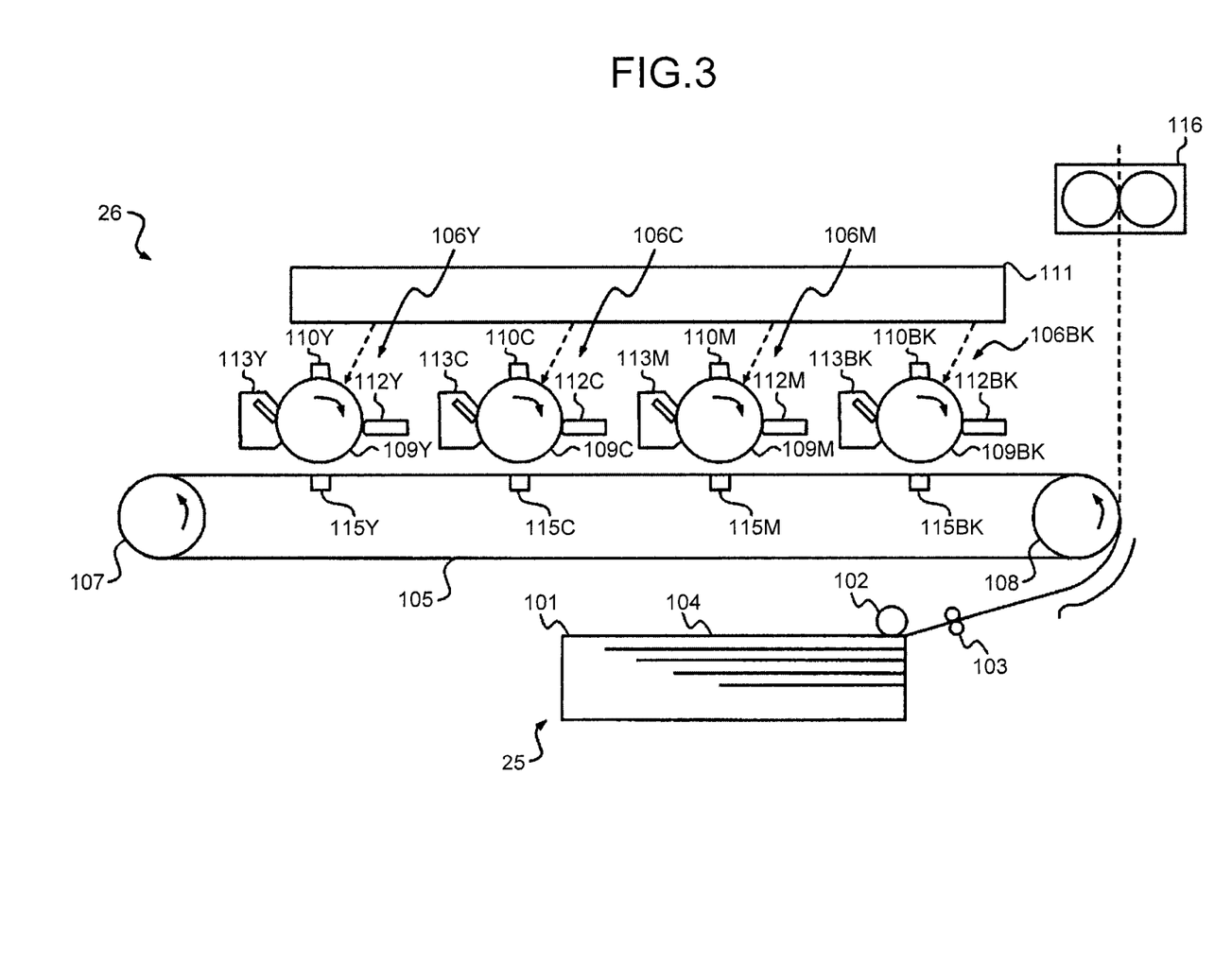
FIG. 3 is a diagram showing a configuration of a print engine according to the embodiment of the present invention.

Subsequently, a configuration of the print engine 26 according to the present embodiment is explained with reference to FIG. 3. As shown in FIG. 3, the print engine 26 according to the present embodiment is a so-called tandem type, and has a configuration in which a plurality of image forming units 106 to form different color images are aligned along a conveying belt 105 which is an endless moving body. Namely, a plurality of image forming units (electrophotographic process units) 106BK, 106M, 106C, and 106Y are arranged in this order from the upstream in a conveying direction of the conveying belt 105 along the conveying belt 105 which is an intermediate transfer belt on which an intermediate transfer image to be transferred onto a sheet (an example of a recording medium) 104 which has been separated and fed by a sheet feed roller 102 and a separation roller 103 from a sheet tray 101 is formed.

The plurality of image forming units 106BK, 106M, 106C, and 106Y only differ from one another in color of toner images that they form and have the same internal configuration. The image forming unit 106BK forms a black image, the image forming unit 106M forms a magenta image, the image forming unit 106C forms a cyan image, and the image forming unit 106Y forms a yellow image. In the description below, the image forming unit 106BK will be explained specifically, and since the other image forming units 106M, 106C, and 106Y are similar to the image forming unit 106BK, for each element of the image forming units 106M, 106C, and 106Y, a reference numeral distinguished by "M", "C", or "Y" respectively will be used in the drawing in place of "BK" used for each element of the image forming unit 106BK, and explanation thereof will be omitted.

The conveying belt 105 is an endless belt supported by a drive roller 107, which is driven to rotate, and a driven roller 108. The drive roller 107 is driven to rotate by a drive motor (not shown). The drive motor, the drive roller 107, and the driven roller 108 serve as a drive unit to drive the conveying belt 105, which is an endless moving body, to move.

In image formation, the first image forming unit 106BK transfers a black toner image onto the conveying belt 105 driven to rotate. The image forming unit 106BK is composed of a photosensitive drum 109BK as a photoreceptor and a charger 110BK, an optical writing device 200, a developing unit 112BK, a photoreceptor cleaner (not shown), a neutralization device 113BK which are arranged around the photosensitive drum 109BK, and the like. The optical writing device 111 is configured to expose the photosensitive drums 109BK, 109M, 109C, and 109Y (hereinafter, collectively referred to as "photosensitive drum(s) 109") to light, respectively.

During image formation, an outer circumferential surface of the photosensitive drum 109BK is uniformly charged by the charger 110BK in the dark, and then exposed to light from a light source of the optical writing device 200 according to a black image, and as a result, an electrostatic latent image is formed on the outer circumferential surface of the photosensitive drum 109BK. The developing unit 112BK develops the electrostatic latent image into a visible image using black toner, and as a result, a black toner image is formed on the photosensitive drum 109BK.

This toner image is transferred onto the conveying belt 105 at a position where the conveying belt 105 comes in contact with or comes closest to the photosensitive drum 109BK (a transfer position) by action of a transfer unit 115BK. As a result, an image formed of the black toner is formed on the conveying belt 105. After the transfer of the toner image onto the conveying belt 105, unwanted toner remaining on the outer circumferential surface of the photosensitive drum 109BK is removed by the photoreceptor cleaner, and the photosensitive drum 109BK is electrically neutralized by the neutralization device 113BK to make the photosensitive drum 109BK ready for next image formation.

The black toner image transferred onto the conveying belt 105 by the image forming unit 106BK in this way is conveyed to the next image forming unit 106M by driving of the conveying belt 105 by the roller. In the image forming unit 106M, a magenta toner image is formed on the photosensitive drum 109M by a process similar to an image forming process performed in the image forming unit 106BK, and the toner image is transferred so as to be superimposed on the already-formed black image.

The black and magenta toner images transferred onto the conveying belt 105 are further conveyed to the next image forming units 106C and 106Y, and, through a similar operation, a cyan toner image formed on the photosensitive drum 109C and a yellow toner image formed on the photosensitive drum 109Y are sequentially transferred onto the already-transferred image in a superimposed manner. In this manner, a full-color intermediate transfer image is formed on the conveying belt 105.

The sheets 104 contained in the sheet tray 101 is fed sequentially from the top, and the intermediate transfer image formed on the conveying belt 105 is transferred onto a surface of the sheet 104 at a position where a conveyance path of the sheet 104 comes in contact with or comes closest to the conveying belt 105. Accordingly, an image is formed on the surface of the sheet 104. The sheet 104 on the surface of which the image has been formed is further conveyed, and the image is fixed on the sheet 104 by a fixing unit 116, and after that, the sheet 104 is discharged to the outside of the image forming apparatus.

Figure 4:
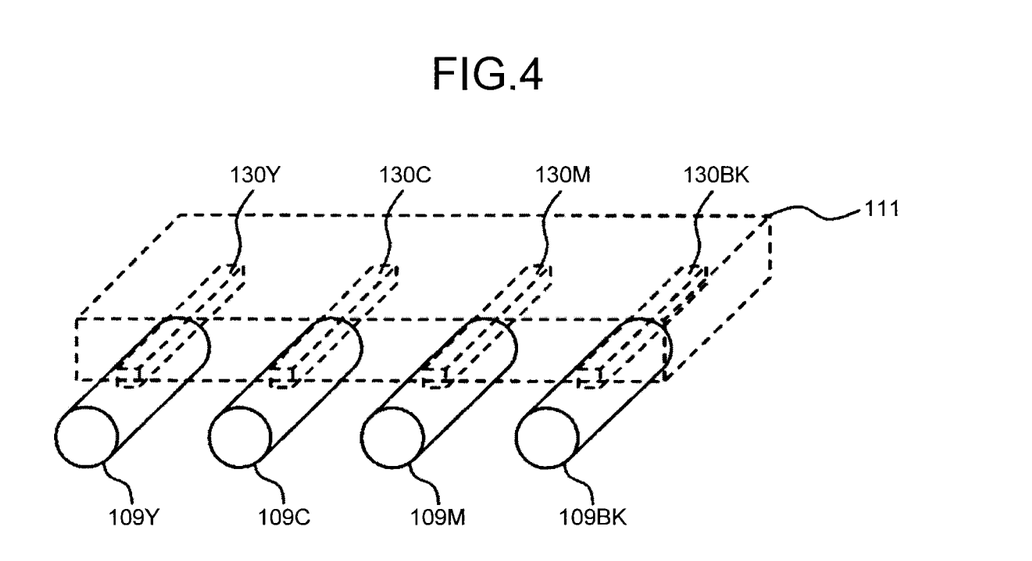
FIG. 4 is a diagram schematically showing a configuration of an optical writing device according to the embodiment of the present invention.

Subsequently, an optical writing device 111 according to the present embodiment is explained. FIG. 4 is a diagram showing positional relationship between the optical writing device 111 according to the present embodiment and the photosensitive drums 109. As shown in FIG. 4, irradiation lights to be irradiated to the photosensitive drums 109BK, 109M, 109C, and 109Y are emitted from LED arrays (LEDAs) 130BK, 130M, 130C, and 130Y (hereinafter, collectively referred to as "LEDA 130") which are light sources, respectively.

The LEDA 130 is composed of a plurality of LEDs which are light-emitting elements and are aligned in a main scanning direction of the photosensitive drum 109. A control unit included in the optical writing device 111 controls turning on and off of each of the LEDs aligned in the main scanning direction with respect to each main scanning line on the basis of drawing information input from the controller 20, thereby selectively exposing the surface of the photosensitive drum 109 to a light and forming an electrostatic latent image on the photosensitive drum 109.

Figure 5:
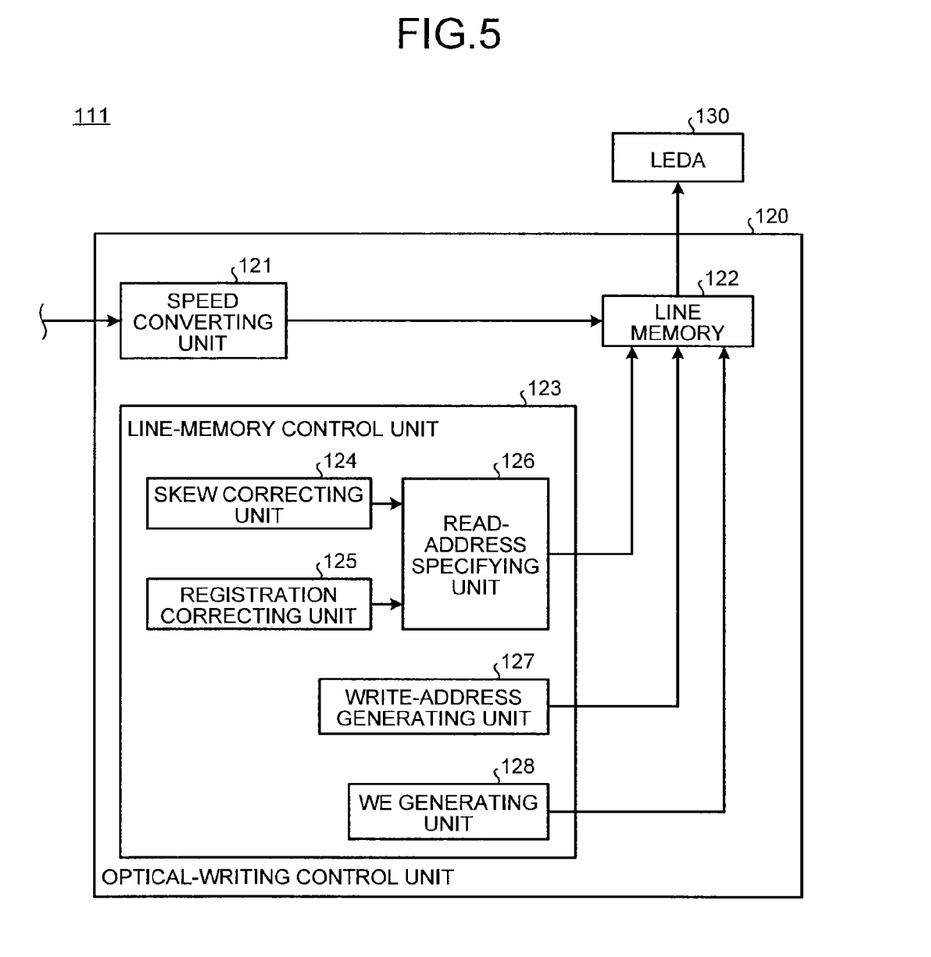
FIG. 5 is a block diagram showing a control unit of the optical writing device according to the embodiment of the present invention.

Subsequently, a control block of the optical writing device 111 according to the present embodiment is explained with reference to FIG. 5. FIG. 5 is a diagram showing a functional configuration of an optical-writing control unit 120 to control the optical writing device 111 according to the present embodiment and connection relation between the optical-writing control unit 120 and the LEDA 130.

As shown in FIG. 5, the optical-writing control unit 120 according to the present embodiment includes a speed converting unit 121, a line memory 122, and a line-memory control unit 123. The line-memory control unit 123 includes a skew correcting unit 124, a registration correcting unit 125, a read-address specifying unit 126, a write-address generating unit 127, and a write enable (WE) generating unit 128.

Incidentally, just like the main body of the image forming apparatus 1 explained in connection with FIG. 1, the optical-writing control unit 120 has an information processing mechanism like the CPU 10 and storage media such as the RAM 11 and the ROM 12, and, just like the controller 20 of the image forming apparatus 1, the optical-writing control unit 120 is composed of a combination of a software control unit, which is made up in such a way that a control program stored in a storage medium such as the ROM 12 is loaded into the RAM 11 and the CPU 10 performs an operation in accordance with the program, and hardware.

Then, the optical writing device 111 shown in FIG. 5 is controlled by the optical-writing control unit 120 configured as described above. As explained in connection with FIG. 4, the LEDAs 130 are installed so as to correspond to the respective photosensitive drums 109 for Y, C, M, and BK colors. Therefore, in the optical-writing control unit 120, the speed converting units 121 and sequence conversion SRAMs 122 are also installed so as to correspond to the respective Y, C, M, and BK colors and the line-memory control unit 123 controls the line memories 122 corresponding to the respective Y, C, M, and BK colors.

The speed converting unit 121 converts a frequency of pixel information input at a predetermined frequency on a pixel to pixel basis from the controller 20 and stores the pixel information in the line memory 122. In the present embodiment, storage of pixel information into the line memory 122 is described as write operation. Namely, the speed converting unit 121 serves as a pixel-information acquiring unit that acquires pixel information input from the controller 20 and stores the acquired pixel information in the line memory 122.

The line memory 122 inputs the pixel information stored by the speed converting unit 121 to the LEDA 130 in accordance with control by the line-memory control unit 123. At this time, a process for skew correction or registration correction is performed by the line-memory control unit 123, and an address of a pixel to be read out from the line memory 122 is specified. In the present embodiment, the input of pixel information from the line memory 122 to the LEDA 130 is described as read operation.

The above-mentioned skew correction is a process of correcting a tilt of an image caused by an error in assembly of the LEDA 130 or the photosensitive drum 109, and the tilt of the image is corrected by shifting the image in the sub-scanning direction depending on a position on a main scanning line. This process is realized by specifying an address of the line memory 122 from which pixel information is read out.

The skew correcting unit 124 is a module handling a process of such skew correction; to shift an image in the sub-scanning direction depending on the position on the main scanning line as described above, the skew correcting unit 124 generates information to specify a read address of the line memory 122 (hereinafter, referred to as a "read address signal") and inputs the generated read address signal to the read-address specifying unit 126. Namely, in the present embodiment, the read address signal is used as a tilt correction signal, and the skew correcting unit 124 serves as a tilt correcting unit.

Furthermore, the above-mentioned registration correction is a process of correcting misregistration of an image caused by an error in assembly of the LEDA 130 or the photosensitive drum 109, and is a process of shifting a timing to expose the photosensitive drum 109 with the LEDA 130, thereby shifting an overall position of the image. By this process, a timing to input pixel information from the line memory 122 to the LEDA 130 is shifted, and accordingly a timing at which the line-memory control unit 123 specifies a read address to the line memory 122, i.e., a timing to read is shifted.

The registration correcting unit 125 is a module handling a process of such registration correction; the registration correcting unit 125 inputs a signal to specify the timing to read to shift the overall position of the image as described above (hereinafter, referred to as a "timing to read signal") to the read-address specifying unit 126. Namely, the timing to read signal is used as a position correction signal, and the registration correcting unit 125 serves as a position correcting unit.

The read-address specifying unit 126 inputs a signal to read out pixel information from a specified address of the line memory 122 into the LEDA 130 to the line memory 122 on the basis of a read address signal acquired from the skew correcting unit 124 and a timing to read signal acquired from the registration correcting unit 125. Namely, the read-address specifying unit 126 serves as a pixel-information-input control unit.

Accordingly, pixel information is read out from the line memory 122 into the LEDA 130 to control light emission of the LEDA 130. Incidentally, in the line-memory control unit 123, in addition to the skew correction and registration correction as described above, a process of converting a pixel array in accordance with a pixel-array conversion rule in the LEDA 130 or the like is performed. This process is also made by specifying a read address from which pixel information is read out from the line memory 122.

The write-address generating unit 127 outputs a write address signal to specify an address where pixel information input from the speed converting unit 121 into the line memory 122 is to be stored. The pixel information input from the speed converting unit 121 is stored in order of addresses in the line memory 122. Namely, the write-address generating unit 127 outputs a write address signal according to the order of addresses of storage areas in the line memory 122.

The WE generating unit 128 outputs a write enable signal to control a timing to store pixel information input from the speed converting unit 121 in the line memory 122. In response to the write enable signal input from the WE generating unit 128, the line memory 122 stores pixel information in an address specified in a write address signal input from the write-address generating unit 127.

In this manner, in the optical-writing control unit 120 according to the present embodiment, pixel information stored in the line memory 122 by the speed converting unit 121 is read out from the line memory 122 at a timing to read and in accordance with a read rule taking into account the above-described two corrections, i.e., the skew correction and the registration correction, and input into the LEDA 130. Therefore, it is not necessary to provide a line memory for skew correction and a line memory for registration correction separately, and a configuration of the optical-writing control unit 120 can be simplified.

Number of lines of the line memory 122 used for skew correction is determined according to a correction amount of skew correction in a sub-scanning direction, and number of lines of the line memory 122 used for registration correction is determined according to a correction amount of registration correction in the sub-scanning direction. Here, a correction amount of registration correction in the sub-scanning direction is generally within one line; on the other hand, a correction amount of skew correction in the sub-scanning direction can be about ten lines depending on the above-described error in assembly.

Incidentally, in the optical writing device 111 according to the present embodiment, each line of an original image is divided in the sub-scanning direction to divide light emission of the LEDA 130 into several batches, thereby enabling the skew correction and registration correction in units of a unit obtained by dividing each line of the original image. Then, the above-described number of lines according to a correction amount of registration correction in the sub-scanning direction or a correction amount of skew correction in the sub-scanning direction denotes number of lines when such division is performed.

As described above, the number of lines of the line memory 122 required for skew correction is relatively large; however, the number of actually-required lines becomes clear after the LEDA 130 and the photosensitive drum 109 are assembled. Therefore, in a design phase of the optical-writing control unit 120, it is common to perform design in which the number of lines of the line memory 122 for skew correction is set to leave a margin as large as possible.

Consequently, the number of lines of the line memory 122 secured for skew correction is smaller than required depending on the above-described error in assembly, and some lines are often not used. In the present embodiment, on the assumption that a larger number of lines of the line memory 122 are secured for skew correction, instead of securing separate line memories for skew correction and registration correction, skew correction and registration correction are performed together on pixel information stored in the single line memory 122. Consequently, unused lines of the line memory provided for skew correction while leaving the room can be used as a line memory for registration correction, and a capacity of the line memory 122 can be reduced while leaving room for the number of lines of the line memory 122 for skew correction, thereby making the configuration more efficient.

Figure 6:
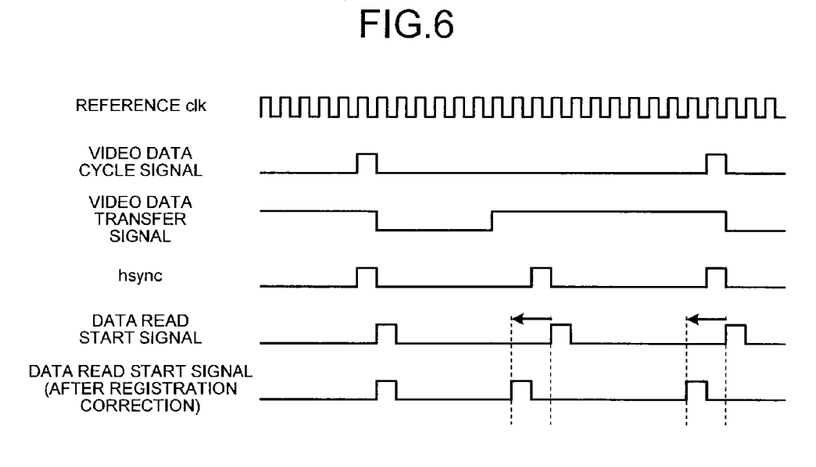
FIG. 6 is a timing chart showing a control signal of an optical-writing control unit according to the embodiment of the present invention.

Subsequently, a timing of a control signal to control operation of the optical writing device 111 according to the present embodiment and a timing of operation of the optical writing device 111 are explained. FIG. 6 is a timing chart showing a control signal of the optical-writing control unit 120 according to the present embodiment. As shown in FIG. 6, the optical-writing control unit 120 operates in accordance with "reference clk".

A "video data cycle signal" is a signal indicating a cycle in which video data input from the controller 20 is imported and stored in the line memory 122 with respect to each main scanning line. The controller 20 outputs pixel information with respect to each main scanning line on a predetermined cycle. Namely, the cycle of the "video data cycle signal" is a cycle of a frequency after conversion by the speed converting unit 121.

A "video data transfer signal" is a signal indicating a timing at which the speed converting unit 121 imports video data input from the controller 20 and stores the imported video data in the line memory 122 according to the beginning of the "video data cycle signal". In the present embodiment, the speed converting unit 121 imports video data input from the controller 20 and stores the imported video data in the line memory 122 in a period in which the "video data transfer signal" is low.

An "hsync" is a horizontal synchronization signal, and is a signal indicating a cycle in which the LEDA 130 is caused to emit a light. As described above, the optical writing device 111 according to the present embodiment divides each line of an original image, i.e., pixel information input for each cycle of the "video data cycle signal" to input into the LEDA 130, thereby writing each line of the original image on the photosensitive drum 109 by light emission performed in multiple batches. The "hsync" is a horizontal synchronization signal indicating the divided cycle. In an example shown in FIG. 6, the cycle of the "hsync" is a cycle obtained by dividing the cycle of the "video data cycle signal" into two divisions.

A "data read start signal" is a signal set for each LEDA 130 according to the beginning of the "hsync", and is a signal indicating a timing to read out pixel information from the line memory 122 into the LEDA 130 with respect to each main scanning line. The registration correction made by the registration correcting unit 125 is performed by adjusting a timing of the beginning of the "data read start signal" as shown by a "data read start signal (after registration correction)" with respect to each LEDA 130.

In FIG. 6, only one type of "data read start signal" is illustrated; however, actually, "data read start signals" for the respective LEDAs 130 for respective Y, C, M, and BK colors are generated at different timings according to a position in the sub-scanning direction and conveying speed of the conveying belt 105. Furthermore, the "data read start signal" for each color is corrected as shown by the "data read start signal (after registration correction)", and as a result, an image obtained by superimposing Y, C, M, and BK images is transferred onto a proper location of a sheet to be output.

Figure 7:
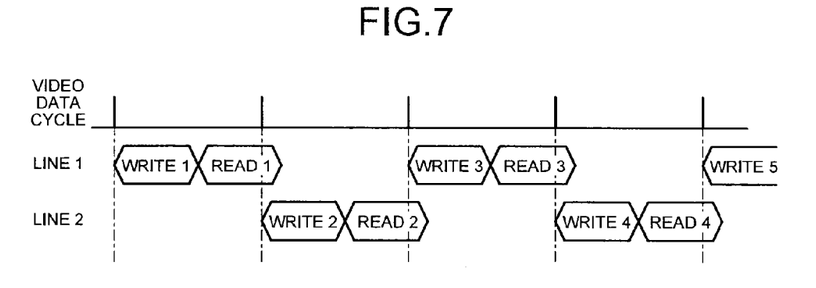
FIG. 7 is a diagram showing a timing to write and a timing to read according to the embodiment of the present invention in chronological order.

Subsequently, a problem caused by the number of lines of the line memory 122 is explained. FIG. 7 is a diagram showing an example of a timing to write pixel information onto the line memory 122 and a timing to read pixel information from the line memory 122 in a case where the number of lines for registration correction is two. "WRITE 1", "WRITE 2", . . . shown in FIG. 7 correspond to a period of writing pixel information onto the line memory 122, i.e., a period in which a video data transfer signal shown in FIG. 6 is "Low", and are each initiated in response to the "video data transfer signal".

Furthermore, "READ 1", "READ 2", . . . shown in FIG. 7 are a period of reading pixel information from the line memory 122 executed in accordance with a single WRITE onto the line memory 122. In other words, the period of each of "Read 1", "Read 2", . . . shown in FIG. 7 is a period in which light emission is performed for writing one line of an original image onto the photosensitive drum 109 in batches. Namely, the respective periods of "Read 1", "Read 2", . . . shown in FIG. 7 include beginnings of the "hsync", number of which corresponds to number into which one main scanning line of the original image is divided.

Incidentally, the skew correction made by the skew correcting unit 124 is performed by changing a main scanning line from which pixel information is read out in the read period of each of "Read 1", "Read 2", . . . shown in FIG. 7 in the sub-scanning direction depending on a position in the main scanning direction.

Figure 8:
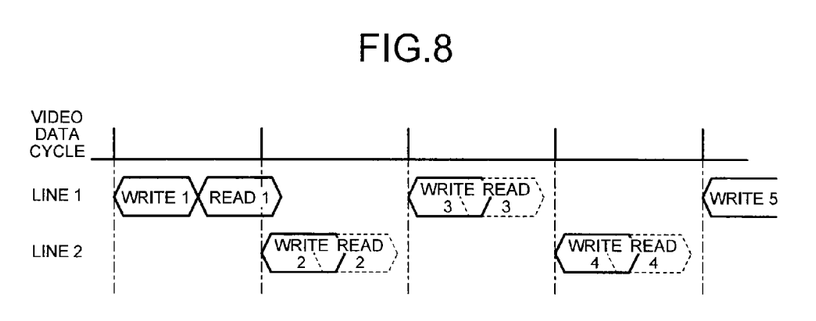
FIG. 8 is a diagram showing the timing to write and timing to read according to the embodiment of the present invention in chronological order.
Figure 9:
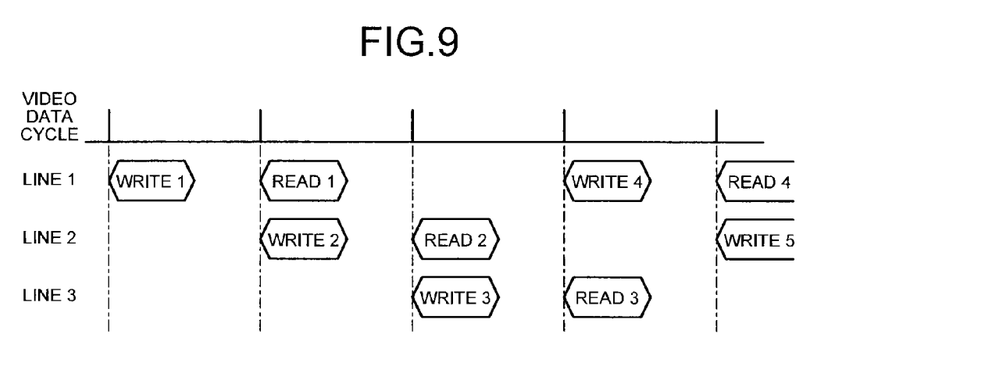
FIG. 9 is a diagram showing the timing to write and timing to read according to the embodiment of the present invention in chronological order.
Figure 10:
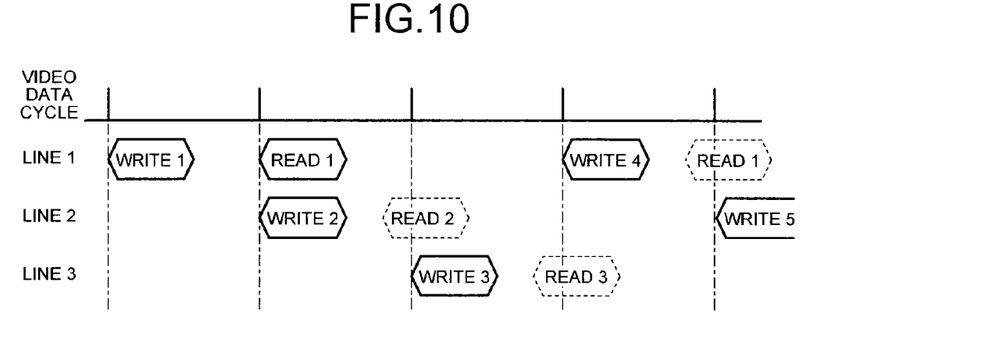
FIG. 10 is a diagram showing the timing to write and timing to read according to the embodiment of the present invention in chronological order.

In a case of the timing to write and read as shown in FIG. 7, when the timing to read is shifted for registration correction, the write period and the read period overlap with each other as shown in FIG. 8 if the number of lines for registration correction is two, and the registration correction cannot be performed. On the other hand, when three lines are provided for registration correction, even if the write period and the read period are not changed, there is enough time occurs between the timings as shown in FIG. 9, so registration correction can be performed as shown in FIG. 10.

Incidentally, as one mode of registration correction, as shown in FIG. 8, a mode is used in which shift of the timing to read is started from the second line in pixel information input from the controller 20 with respect to each main scanning line. As described above, by using unused lines of the line memory for skew correction as a line memory for registration correction, lines of the line memory, number of which is enough for registration correction, can be made available without separately providing a line memory for registration correction, and the registration correction can be performed as shown in FIG. 10.

Figure 11:
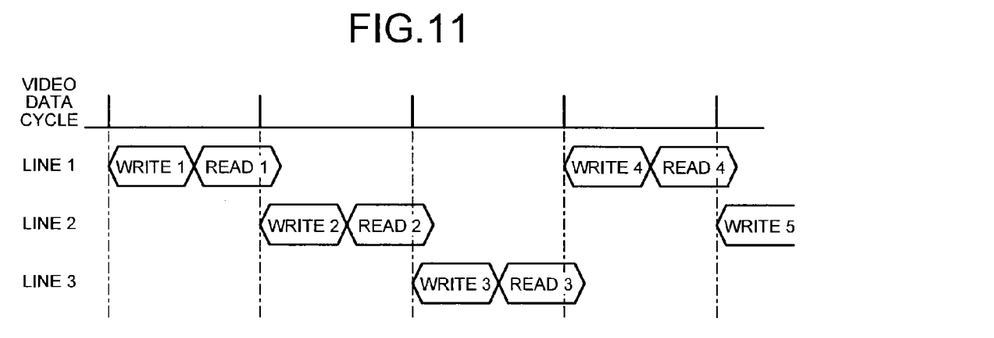
FIG. 11 is a diagram showing the timing to write and timing to read according to the embodiment of the present invention in chronological order.

Subsequently, adjustment of the timing to write pixel information onto the line memory 122 in response to the "video data cycle signal", i.e., a timing at which the "video data transfer signal" becomes low is explained. FIG. 11 is a diagram showing an example of the timing to write onto the line memory 122 and the timing to read from the line memory 122 in a different mode from those in FIGS. 7 and 9.

Figure 12:
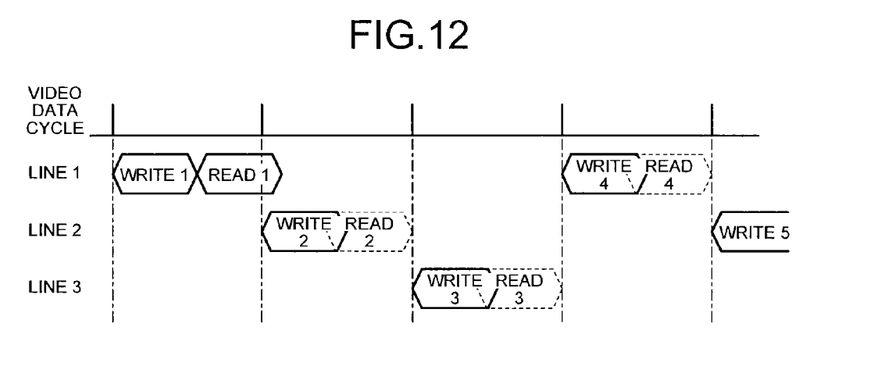
FIG. 12 is a diagram showing the timing to write and timing to read according to the embodiment of the present invention in chronological order.

In the case shown in FIG. 11, when intending to perform registration correction, the timing to write and the timing to read overlap with each other as shown in FIG. 12, and this causes a problem like in a case of FIG. 8. In a mode shown in FIG. 11, for example, in the "LINE 1", there is enough time between "READ 1" and "WRITE 4", so, when shifting "READ 4" before, if "WRITE 4" can be shifted before by the same amount as "READ 4", registration correction can be performed; however, the timing to write pixel information onto the line memory 122 cannot be shifted before the beginning of a corresponding "video data cycle signal", so in a state shown in FIG. 12, it is impossible to shift the each timing to write including "WRITE 4" before.

Figure 13:
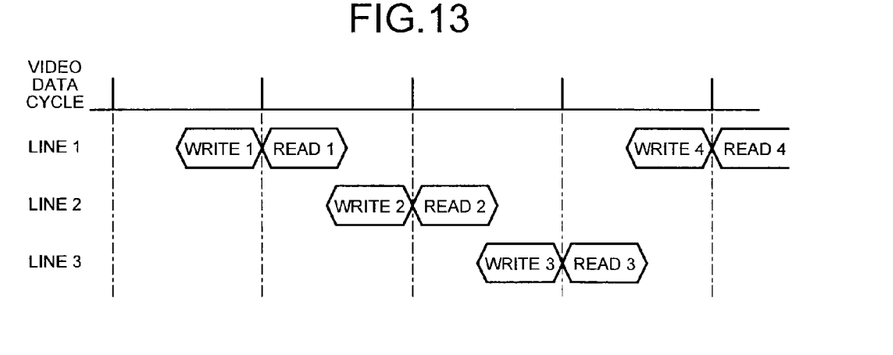
FIG. 13 is a diagram showing the timing to write and timing to read according to the embodiment of the present invention in chronological order.

On the other hand, it is conceivable that the timing to write corresponding to the beginning of each "video data cycle signal" is delayed in advance as shown in FIG. 13. Thereby, as shown in FIG. 14, when shifting the timing to read before for registration correction, the timing to write corresponding to the timing to read can also be shifted before, and registration correction can be performed.

Figure 14:
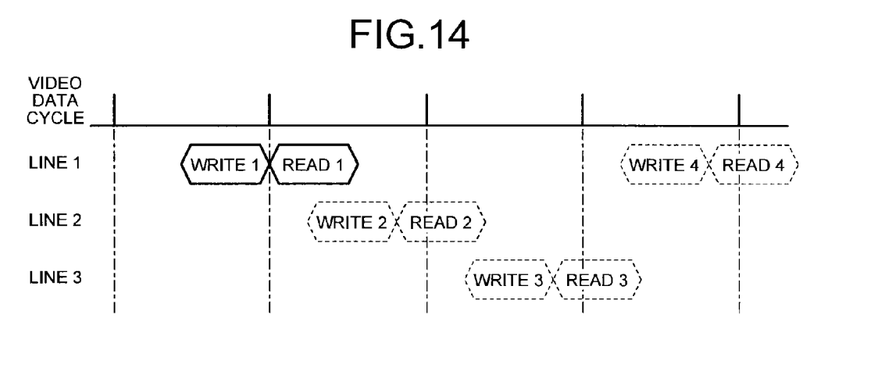
FIG. 14 is a diagram showing the timing to write and timing to read according to the embodiment of the present invention in chronological order.

Incidentally, in FIGS. 13 and 14, taking a case where the timing to read is shifted before in order to perform registration correction as an example; therefore, there is described a case where the timing to write is delayed in advance so as to be placed at an end of the video data cycle as an example. However, when the timing to read is shifted after in order to perform registration correction, the exact opposite configuration is taken. Namely, the gist shown in FIGS. 13 and 14 is that the timing to write in the video data cycle is set on the basis of a direction of registration correction.

Incidentally, as described above, in the present embodiment, correction in units of a unit less than one main scanning line of an original image is made possible, so reading of pixel information from the line memory 122 into the LEDA 130 is performed in multiple batches with respect to one time of writing of pixel information onto the line memory 122 by the speed converting unit 121. Timing correction such as above described in the present embodiment is performed by correcting such a timing to read performed in multiple batches, i.e., the timing of the beginnings of the "data read start signal" shown in FIG. 6.

Here, in the optical-writing control unit 120 according to the present embodiment, details of correction is different between in a first timing to read and in a subsequent timing to read in the above-described timings to read performed in multiple batches. The cycle of "hsync" is determined by dividing the cycle of the "video data cycle signal", so the first timing to read with respect to one-time writing of pixel information onto the line memory 122 is determined in accordance with the timing of the "video data cycle signal".

Namely, the first timing to read among the above mentioned timings to read performed in multiple batches is corrected by the speed converting unit 121 controlling a phase of the "video data cycle signal". On the other hand, the second and subsequent timing to reads among the above mentioned timings to read performed in multiple batches are corrected by the registration correcting unit 125 adjusting the timing of the "hsync" as shown by the "data read start signal (after registration correction)" in FIG. 6. Consequently, it is possible to achieve high-accuracy correction in the cycle obtained by dividing each line of an original image as described above.

According to the present embodiment, it is possible to reduce the number of line memories installed in an optical writing device and the cost of the device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device that forms an electrostatic latent image on a photoreceptor, the optical writing device comprising:
   a pixel-information acquiring unit that
      acquires pixel information corresponding to pixels of an image to be formed as the electrostatic latent image, and
      stores the acquired pixel information in a storage medium with respect to each main scanning line;
   a tilt correcting unit that generates a tilt correction signal specifying a main scanning line from which the pixel information is read out of the storage medium and inputted to a light source, which exposes the photoreceptor to light, in order to correct a tilt of the electrostatic latent image formed on the photoreceptor;
   a position correcting unit that generates a position correction signal specifying a timing to input the pixel information to the light source in order to correct a position of the electrostatic latent image formed on the photoreceptor in a sub-scanning direction; and
   a pixel-information-input control unit that controls input of the pixel information from the storage medium to the light source in response to the tilt correction signal and the position correction signal,
   wherein the pixel-information-input control unit adjusts input timing of the pixel-information to the light source, by adjusting the input timing of the pixel-information to the storage medium; and
   the position correction unit adjusts input timing of the pixel-information to the light source, by adjusting the input timing from the storage medium to the light source independently of the input timing of the pixel-information to the storage medium.

2. The optical writing device according to claim 1, wherein the pixel-information acquiring unit acquires the pixel information and stores the acquired pixel information in the storage medium on a predetermined cycle, and determines a timing to acquire the pixel information during one cycle in units of the predetermined cycle in accordance with a mode of correction of the position of the electrostatic latent image in the sub-scanning direction made by the position correcting unit.

3. The optical writing device according to claim 2, wherein when the position correcting unit corrects the timing to input the pixel information to the light source to advance that timing, the pixel-information acquiring unit places the timing to acquire the pixel information at an end of one cycle in units of the predetermined cycle.

4. An image forming apparatus comprising an optical writing device that forms an electrostatic latent image on a photoreceptor, wherein the optical writing device comprising:
   a pixel-information acquiring unit that
      acquires pixel information corresponding to pixels of an image to be formed as the electrostatic latent image, and
      stores the acquired pixel information in a storage medium with respect to each main scanning line;
   a tilt correcting unit that generates a tilt correction signal specifying a main scanning line from which the pixel information is read out from the storage medium and inputted to a light source, which exposes the photoreceptor to light, in order to correct a tilt of the electrostatic latent image formed on the photoreceptor;
   a position correcting unit that generates a position correction signal specifying a timing to input the pixel information to the light source in order to correct a position of the electrostatic latent image formed on the photoreceptor in a sub-scanning direction; and
   a pixel-information-input control unit that controls input of the pixel information from the storage medium to the light source in response to the tilt correction signal and the position correction signal,
   wherein the pixel-information-input control unit adjusts input timing of the pixel-information to the light source, by adjusting the input timing of the pixel-information to the storage medium; and
   the position correction unit adjusts input timing of the pixel-information to the light source, by adjusting the input timing from the storage medium to the light source independently of the input timing of the pixel-information to the storage medium.

5. The image forming apparatus according to claim 4, wherein the light source is included in the image forming apparatus, and the light source includes a light emitting diode (LED) array.

6. The image forming apparatus according to claim 4, further comprising a plurality of writing devices each configured to form a latent image of a different color on the photoreceptor.

7. The image forming apparatus according to claim 4, further comprising:
   a developing unit that uses black toner to develop the latent image on the photoreceptor into a toner image;
   a transfer belt that transfers the toner image from the photoreceptor; and
   a cleaning unit that removes remaining toner from the photoreceptor and that neutralizes an electric charge of the photoreceptor.

8. A method of controlling an optical writing device that forms an electrostatic latent image on a photoreceptor, the method comprising:
   acquiring pixel information corresponding to pixels of an image to be formed as the electrostatic latent image, and
   storing the acquired pixel information in a storage medium with respect to each main scanning line;
   generating a tilt correction signal specifying a main scanning line from which the pixel information is read out of the storage medium and inputted to a light source, which exposes the photoreceptor to light, in order to correct a tilt of the electrostatic latent image formed on the photoreceptor and outputting the generated tilt correction signal;
   generating a position correction signal specifying a timing to input the pixel information to the light source in order to correct a position of an electrostatic latent image formed on the photoreceptor in a sub-scanning direction and outputting the generated position correction signal; and
   controlling input of the pixel information from the storage medium to the light source in response to the tilt correction signal and the position correction signal,
   wherein input timing of the pixel-information to the light source is adjusted by adjusting the input timing of the pixel-information to the storage medium; and
   input timing of the pixel-information to the light source is further adjusted by adjusting the input timing from the storage medium to the light source independently of the input timing of the pixel-information to the storage medium.

* * * * *